(12) United States Patent
Greenzeiger

(10) Patent No.: US 9,191,687 B2
(45) Date of Patent: Nov. 17, 2015

(54) CONTENT PACKAGE MODIFICATION BASED ON PERFORMANCE DATA

(75) Inventor: Michael Froimowitz Greenzeiger, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 724 days.

(21) Appl. No.: 13/441,251

(22) Filed: Apr. 6, 2012

(65) Prior Publication Data

US 2013/0268651 A1      Oct. 10, 2013

(51) Int. Cl.
| | |
|---|---|
| G06F 15/173 | (2006.01) |
| H04N 21/25 | (2011.01) |
| H04N 21/254 | (2011.01) |
| H04N 21/266 | (2011.01) |
| H04N 21/442 | (2011.01) |
| H04N 21/845 | (2011.01) |
| H04N 21/81 | (2011.01) |

(52) U.S. Cl.
CPC .......... *H04N 21/252* (2013.01); *H04N 21/254* (2013.01); *H04N 21/266* (2013.01); *H04N 21/44204* (2013.01); *H04N 21/8456* (2013.01); *H04N 21/812* (2013.01)

(58) Field of Classification Search
CPC .................................................. G06F 15/173
USPC .................................................. 709/224, 246
See application file for complete search history.

(56) References Cited

U.S. PATENT DOCUMENTS

| | | | |
|---|---|---|---|
| 7,406,434 B1 * | 7/2008 | Chang et al. | 705/14.43 |
| 7,962,604 B1 | 6/2011 | Morris et al. | |
| 2011/0040634 A1 * | 2/2011 | Landsberry et al. | 705/14.69 |
| 2011/0194836 A1 * | 8/2011 | Tamura et al. | 386/248 |
| 2011/0225054 A1 | 9/2011 | Morris et al. | |
| 2011/0307325 A1 | 12/2011 | Hsiao et al. | |
| 2013/0028573 A1 * | 1/2013 | Hoofien et al. | 386/248 |

* cited by examiner

*Primary Examiner* — David Lazaro
*Assistant Examiner* — Marie Georges Henry
(74) *Attorney, Agent, or Firm* — Novak Druce Connolly Bove + Quigg, LLP

(57) ABSTRACT

The performance of a content package can be influenced by a variety of factors, at least some of which can be identified by analyzing user interaction events. The user interaction events can be analyzed to generate data representative of the current performance of the content package. Based on the performance data, one or more modifications can be identified and recommended to the content package owner. A modification can include a change in file size, a change in encoding quality, a change in a component, and/or a change in a presentation rule.

22 Claims, 20 Drawing Sheets

CONTENT PACKAGE MODIFICATION BASED ON PERFORMANCE DATA

BACKGROUND

1. Technical Field

The present disclosure relates to electronic content delivery and more specifically to optimizing an electronic content package based on performance data.

2. Introduction

The development of digital content delivery has enabled new techniques for creating sophisticated content packages that are highly interactive. It has also made it possible to evaluate the performance of the content packages after distribution to users. For example, it is possible to collect various pieces of data regarding a user's interaction with the content, such as time spent, gestures performed, completed conversions, items viewed, etc. The user interaction data can easily be communicated to the content package owners. However, content package owners often lack an understanding of how the composition of a content package shapes performance of the content package. Therefore, it is not always clear to the content package owners how the user interaction data corresponds to the composition of the content package and more importantly how the user interaction data can be used to maximize performance of a content package for various metrics. For example, data indicating the number of unique users that visited each section of a content package does not necessarily convey to the content package owner whether the content package is performing well or how to change the content package in order to improve the overall performance. Without an understanding of how to correlate user interaction data to changes for improving performance of a content package, content package owners are limited to trial and error techniques or settling for underperformance of the content package.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for recommending modifications to a content package. A method comprises receiving a set of interaction events associated with a content package. The interaction events can be received from multiple client devices in response to a variety of different user interactions with the content package, such as a view, a gesture, a conversion, and/or a video event. The set of events are analyzed to determine whether at least one modification from a plurality of possible recommendations should be recommend for at least one segment in the content package. In some embodiments, the interaction events are analyzed to generate performance data, which is then used to determine whether one or more pre-defined changes should be recommended. After determining that a modification should be recommended a recommendation, including the at least one modification, is presented to a content package owner associated with the content package.

A second method comprises receiving a set of events associated with a content package that is divided into a fixed sequence segment and a variable sequence segment. The set of events are analyzed to determine whether at least one change to a segment in the content package should be recommended. After determining that at least one change should be recommended, a content package owner associated with the content package is notified of the at least recommended change.

In some embodiments, the set of events are analyzed to generate user retention performance data associated with a segment that is divided into multiple sections. The difference between a first retention rate associated with a first section and a second retention rate associated with a second section that exceeds a specified threshold is identified. The set of events are analyzed to generate time to event data for the identified second section. At least one change is recommended when the time to event data for the second section exceeds a threshold time.

In some embodiments, the set of events are analyzed to generate crash rate performance data. At least one change specific to a client device type is recommended when a client device type with a crash rate above a specified threshold value is identified.

In some embodiments, the set of events are analyzed to generate video viewing performance data. An adjustment to the video is recommended when the difference between a percentage of users that completed the video and a percentage of users that started the video is below a specified threshold value.

In some embodiments, the set of events are analyzed to generate a number of sections visited performance data for a segment that is divided into multiple sections. Based on the number of sections visited data, a median number of sections visited is identified. A decrease in the number of sections in the segment is recommended when a difference between a first value associated with the median number of sections visited and a second value associated with a maximum number of sections visited exceeds a specified threshold value.

In some embodiments, the set of events are analyzed to generate unique views per section performance data for a segment that is divided into multiple sections. A change to the content of the segment is recommended when a section with a unique views percentage below a specified threshold value is identified.

A non-transitory computer-readable storage media embodiment comprises receiving a set of events associated with a content package. The events received from multiple client devices in response to a variety of different user interactions with the content package, such as a view, a gesture, a conversion, and/or a video event. The set of events are analyzed to identify at least one recommended modification to at least one segment in the content package. In some embodiments, the interaction events are analyzed to generate performance data. Based on the generated performance data, one or more pre-defined changes are identified. At least one of the pre-defined changes is selected as the at least one recommended modification. In response to the at least one recommended modification, an alternative content package arrangement is automatically selected.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
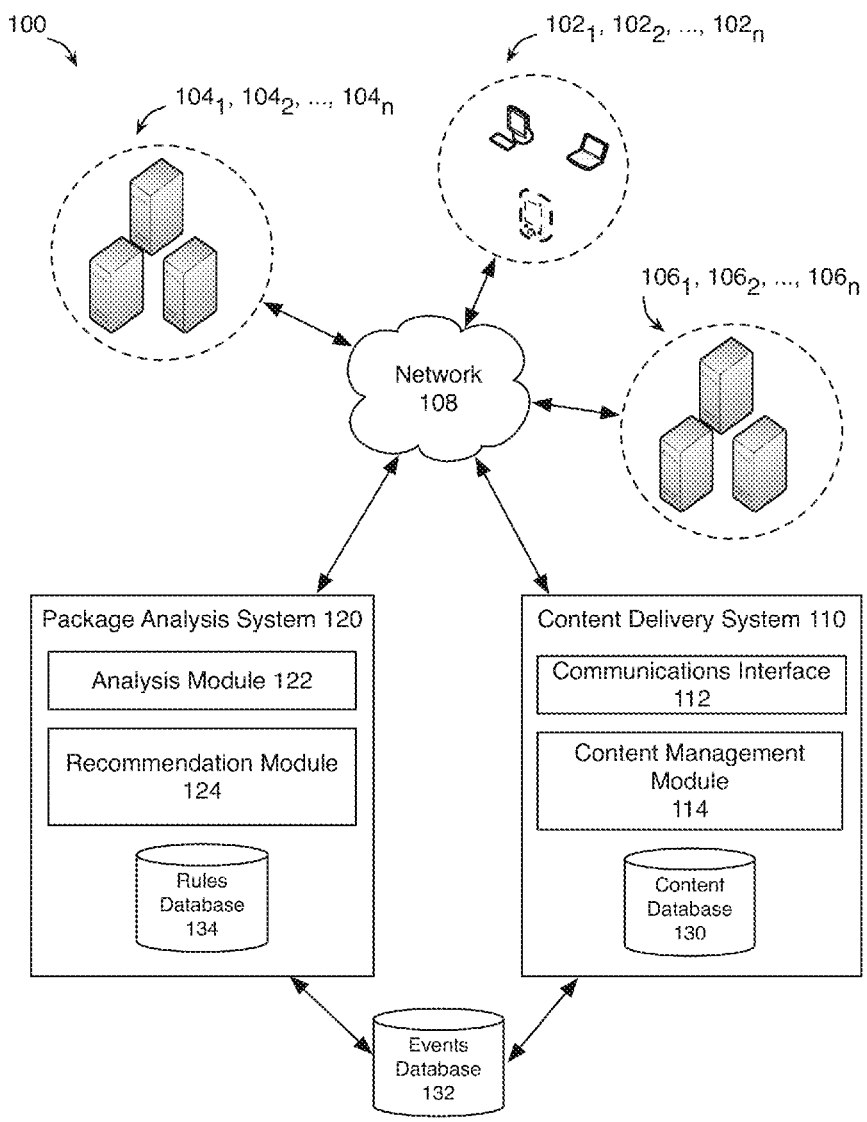
FIG. 1 illustrates an exemplary configuration of devices and a network.

The presently disclosed system, method, and non-transitory computer readable media are particularly useful for recommending changes to a content package based on the current performance of the content package. An exemplary system configuration 100 is illustrated in FIG. 1, wherein electronic devices communicate via a network for purposes of exchanging content and other data. The system can be configured for use on a local area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a content package is delivered to user terminals $102_1, 102_1, \ldots, 102_n$ (collectively "102") connected to a network 108 by direct and/or indirect communication with a content delivery system 110. In particular, the content delivery system 110 receives a request for a content package including electronic-invitational content, such as a web page or portions thereof, an application, a game, or media, etc., from one of user terminals 102. The content package can include multiple sections grouped into one or more segments in a fixed or variable sequence.

In a fixed sequence segment, the segment can include one or more sections where each section has a single successor section. For example, a fixed sequence segment can include a video that is divided into four sections: start to 25%, 25% to 50%, 50% to 75%, and 75% to finish. In this example, a user currently viewing the start to 25% section has two options: quit viewing the video or continue to the next section, the 25% to 50% section. While the disclosure frequently uses a video split into four equal sections to illustrate the present technology, a video can be split into any number of sections. Furthermore, the video sections can be of different lengths. For example, a video can be split into two sections: start to 33% and 33% to finish. In a variable sequence segment, the segment can include one or more sections where each section can have multiple successor sections. For example, a variable sequence segment can include interactive content in which a user can select one or more sections other than a pre-defined successor section. In some cases, the content package can include a transition section, such as a menu section or a landing page section. The transition section can mark the transition between a fixed sequence segment and a variable sequence segment. Therefore, in some cases, a landing page can be the first place where a user can select from a number of successor sections.

Figure 2:
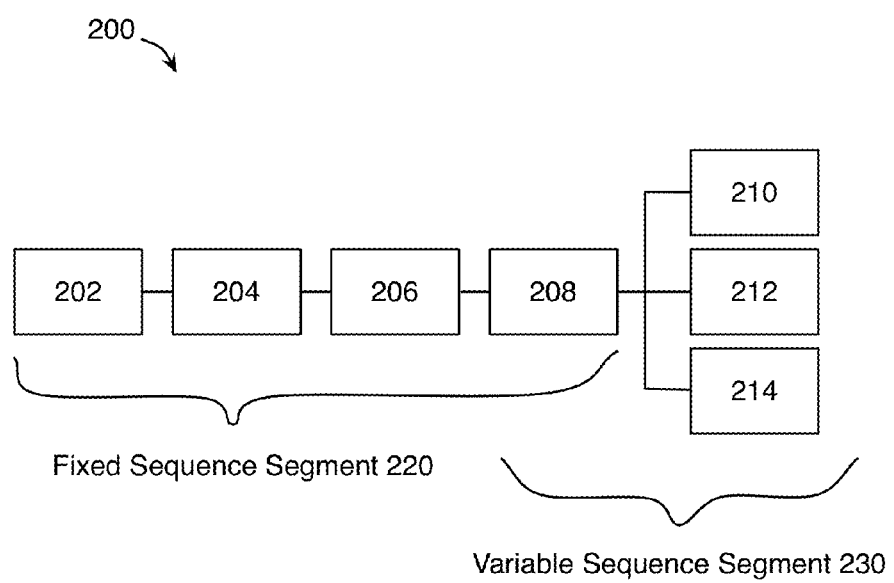
FIG. 2 illustrates an exemplary content package.

FIG. 2 illustrates an exemplary content package that includes a fixed sequence segment 220 and a variable sequence segment 230. The fixed sequence segment 220 includes four sections 202, 204, 206, and 208. A user interacting with the content package can start at section 202 and then the user can progress through the content in the content package sequentially until section 208, the transition section or landing page. At section 208 the user enters the variable sequence segment where the user has the option of progressing to section 210, section 212, or section 214.

In some cases, a section can include invitational content, such as text, graphics, audio, video, executable code or any combination thereof. In some embodiments, the invitational content can be associated with a product or can directly or indirectly advertise a product. In some embodiments, the content package can replace or update invitational content in a content package already delivered to the user terminal.

Further, the invitational content can include active invitational content. That is, invitational content that is designed to primarily elicit a pre-defined response from the user. For example, active invitational content can include one or more types of advertisements configured to be clicked upon, solicit information, or be converted by the user into a further action, such as purchase or download of the advertised item. However, invitational content can also include passive invitational content. That is, invitational content that is designed to primarily inform the user, such as a video. In some cases, passive invitational content can include information that can lead or direct users to other invitational content including active invitational content.

Additionally, invitational content can include dynamic invitational content. That is, invitational content that varies over time or that varies based on user interaction. However, the various embodiments are not limited in this regard and the invitational content can include static invitational content that does not vary over time or that varies based on user interaction. In the various embodiments, invitational content in a content package can be static or dynamic and active or passive. Further, invitational content can include a combination of various types of invitational content in a same content package.

In one exemplary embodiment, a content package can include a single fixed sequence segment and a single variable sequence segment. Furthermore, the variable sequence segment can follow the fixed sequence segment. In this case, the fixed sequence segment is an introduction sequence. In some cases, the fixed sequence segment can include mostly passive invitational content. In some cases, the variable sequence segment can include a greater amount of active invitational content than the fixed sequence segment. However, the present technology is not limited to the exemplary content package described above. In some embodiments, a content package can include one or more fixed sequence segments, one or more variable sequence segments, or any combination thereof. Furthermore, the segments can be in any order. For example, a content package can include a single segment. In another example, a content package can include a variable sequence segment followed by a fixed sequence segment. In yet another example, a content package can include a fixed sequence segment followed by a variable sequence segment followed by a fixed sequence segment. Other combinations are also contemplated by the present disclosure.

Referring back to FIG. 1, after receiving the request for a content package, the content delivery system can cause the content package to be delivered to the user. For example, the content delivery system 110 can send the content package to a user terminal 102 where the content package can be displayed for the user. The content delivery system 110 can include a communications interface 112 to facilitate communications with the user terminals 102 and any other components.

The content delivery system 110 can include a content management module 114 that can facilitate the delivery of a content package to a user terminal 102. In some cases, the content management module can combine content from one or more content providers 104$_1$, 104$_2$, . . . , 104$_n$ (collectively "104") based on a content package arrangement provided by a content package owner 106$_1$, 106$_2$, . . . , 106$_n$ (collective "106"). A content package owner 106 can define a variety of aspects related to a content package. The aspects can include the number, type, and order of the segments; the number of sections in a segment; the layout of and relationship between the sections within a segment; the content included in a section; and/or the presentation rules. For example, a content package owner can specify that the content package includes one fixed sequence segment and one variable sequence segment and that the fixed sequence segment precedes the variable sequence segment. In another example, a content package owner can specify that the fixed sequence segment includes a single video that is divided into four sections. In yet another example, a content package owner can specify that the variable sequence segment includes five sections and also specify the layout of the segment: a landing page section, three sections that are each successors of the landing page, and a section that is a successor to one of the landing page successors. In a further example, a content package owner can specify the content of a section, such as any text and/or media; the font, color, size, etc. of the text and/or media; the size and/or placement of any buttons and/or links; any animation or movement of the text, buttons, links, and/or media; etc.

In some cases, a content package owner can specify a presentation rule. For example, a content package owner can specify a presentation rule where the content package is presented without alteration to client devices of a particular type, but that the video in the fixed sequence segment is in a lower encoding quality when presented to client devices of a different type. In another example, a content package owner can specify a presentation rule where the content package is presented without alteration to client devices connected over a network with a bandwidth above a specified threshold, such as 4G, but that the video in the fixed sequence segment is in a lower encoding quality when presented to client devices connected through a network with a lower bandwidth, such as 3G. In yet another example, a content package owner can specify a presentation rule where the content package is presented without alteration to client devices running a particular operating system or software version, but that an variation of the content package is presented when presented to client devices running a different operation system or software version.

In some cases, a content package owner can specify multiple arrangements for a content package. For example, a content package owner can specify two arrangements where one arrangement includes lower quality videos or excludes one or more videos entirely. In another example, a content package owner can specify two arrangements with a different number of sections in a segment. In yet another example, a content package owner can specify multiple arrangements with a different number and/or type of segments. In a further example, a content package owner can specify multiple arrangements with different memory usage.

Although content providers 104 and content package owners 106 are presented herein as separate entities, this is for illustrative purposes only. In some cases, the content providers 104 and content package owners 106 can be the same entity. Thus, a single entity can both provide the arrangement of the content package and provide the content for the content package.

In some embodiments, the content management module 114 can request that a content provider 104 send the content directly to a requesting user terminal 102. However, to improve performance and/or overall user experience, the content management module 114 can maintain a content database 130 for locally storing/caching content maintained by content providers 104. Alternatively, in some cases, the content management module 114 can retrieve content directly from a content provider 104 prior to distributing a content package to a user terminal 102.

The content management module 114 can also be configured to receive content package events from user terminals 102. The content management module 114 can receive a content package event in response to a variety of different user interactions with the content package, such as passive interaction events, e.g. views; active interaction events, e.g. gestures such as tapping, swiping, clicking; conversions; and/or video events. For example, if a video is divided into four sections, a video event can include video playback reaching a predefined section, such as a 25% marker. A content package event can include an event identifier, a segment identifier, a section identifier, a content package identifier, a device type identifier, a unique user identifier, and/or a time stamp. In some cases, additional information can be included in a content package event. After receiving a content package event, the content management module 114 can store the event in an events database 132 along with events received from one or more other user terminals 102.

The system 100 can also be configured to include a package analysis system 120. The package analysis system 120 can analyze a set of events from the events database 132 to identify one or more possible modifications for a content package, which can be communicated to an owner of the content package. The set of events can include a subset of the events in the events database 132, such as all events for a segment, all events of a particular type for a segment, all events from a particular device type, etc.

A recommended change or modification for a content package can include a change in file size, a change in encoding quality, a change in a component, and/or a change in a presentation rule. In some cases, a change in a component can include a change in the number, type, and/or order of the segments; a change in the number of sections in a segment; a change in the layout of and/or the relationship between the sections within a segment; and/or a change in the content included in a section. In some cases, a recommended modification is isolated to the segment analyzed. However, a recommended modification can also cross segment boundaries. For example, a recommended modification can specify that a section in the variable sequence segment should be moved to the fixed sequence segment. In some cases, a recommended change or modification can be a change to improve performance of the package.

The package analysis system 120 can also include an analysis module 122 that can analyze the set of events. In some embodiments, the analysis module 122 can analyze a set of events to produce performance data. The performance data generated can vary based on the composition of the set of events. In some embodiments, the performance data can include user retention data, cumulative time spent drop off data, absolute time to event data, relative time to event data, unique views per section data, number of sections visited data, average time spent per section data, view path data, exit views data, crash rate by device data, gestures per section data, and/or video viewing data. Other performance data is also possible.

In some cases, the analysis is specific to a section or a segment. That is, the analysis module 122 can analyze a set of events associated with a section or a segment. In some cases, the analysis is specific to a segment type. That is, some analysis can only be performed on or is more meaningful for a set of events received in response to user interaction with a fixed sequence segment or a variable sequence segment, but not both. For example, user retention data, absolute time to event data, and relative time to event data is more meaningful when generated for fixed sequence segments. Likewise, unique views per section data, number of sections visited data, view path data, and exit views data is more meaningful when generated for variable sequence segments.

In some configurations, the analysis module 122 can analyze the events in real time. That is, each time the events database 132 is updated with a new event the analysis module 122 can update the performance data. For example, if the events database 132 receives a new event representing a close event, the analysis module 122 can update the crash rate performance data based on the newly received event. In some cases, when the events database 132 receives a new event, the analysis module 122 can update more than one type of performance data. When the package analysis system 120 is configured to perform real-time analysis, the package analysis system 120 can store the generated performance data for later use.

In some configurations, the analysis module 122 can analyze the events at periodic intervals. In some cases, the intervals can be time based. For example, the analysis module 122 can analyze the events after a specified period of time has passed, such as 24 hours, or at a specified time, such as every Sunday at 5 am. Alternatively, the intervals can be event based. For example, the analysis module 122 can analyze the events after receiving a specified number of events. Alternative intervals are also possible.

In some configurations, the analysis module 122 can analyze the events in response to a request for a recommended modification. That is, when the package analysis system 120 receives a request for a recommended modification, the analysis module 122 can analyze the set of events. In some embodiments, the package analysis system 120 can receive a request for a recommended modification from the content delivery system 110. For example, if the content delivery system 110 receives a request from a content package owner 106 for a recommended modification to a particular content package, the content delivery system 110 can forward that request to the package analysis system 120. Alternatively, the package analysis system 120 can receive a request for a recommended modification directly from a content package owner 106.

In some configurations, the analysis module 122 can analyze the events at periodic intervals and in response to a request for a recommended modification. For example, the analysis module 122 can analyze the events at periodic intervals, but if the package analysis system 120 receives a request for a recommended modification and the previously generated performance data is older than a predefined threshold, then the analysis module 122 can analyze the events to generate fresh performance data.

The package analysis system 120 can also include a recommendation module 124. The recommendation module 124 can use the results produced by the analysis module 122, such as performance data, to identify one or more changes to the content package. In some embodiments, the package analysis system 120 can include a rules database 134, which stores rules that map performance data to one or more pre-defined modifications. For example, the rules database 134 can include a rule that maps crash rate performance data to a modification, such as recommending that at least a portion of the content package is not presented to a poorly performing client device type. In some embodiments, a rule can be based on multiple different performance data. For example, a rule can incorporate user retention performance data and time to event performance data.

In some embodiments, the recommendation module 124 can identify multiple recommendations based on the generated performance data. For example, a single type of performance data may map to multiple modifications or multiple types of performance data may each map to a modification. In some cases, the package analysis system 120 can present all identified recommended modifications to a requesting entity. Alternatively, the recommendation module 124 can select a subset or a single modification to present to a requesting entity. In some cases, the selection can be based on a ranking of modifications.

In some embodiments, the content delivery system 110 can automatically select an alternate content package arrangement in response to one or more recommended modifications. For example, if the recommended modification is to present a content package owner provided multiple arrangements, one specifying the use of lower quality videos, the content delivery system 110 can automatically select the appropriate content package arrangement when presenting content packages to the different client device types. In another example, if the recommended modification is to decrease the number of sections in a particular segment, and the content package owner provided multiple arrangements, one with fewer sections in the identified segment, the content delivery system 110 can automatically switch to presenting the content package using the arrangement with fewer sections in the identified section.

Although the content delivery system 110 and the package analysis system 120 are presented here as separate entities, this is for illustrative purposes only. In some cases, the content delivery system 110 can include the package analysis system 120. Thus, a single entity can both deliver a content package and recommend changes to the content package to improve the performance of the content package.

Figure 3:
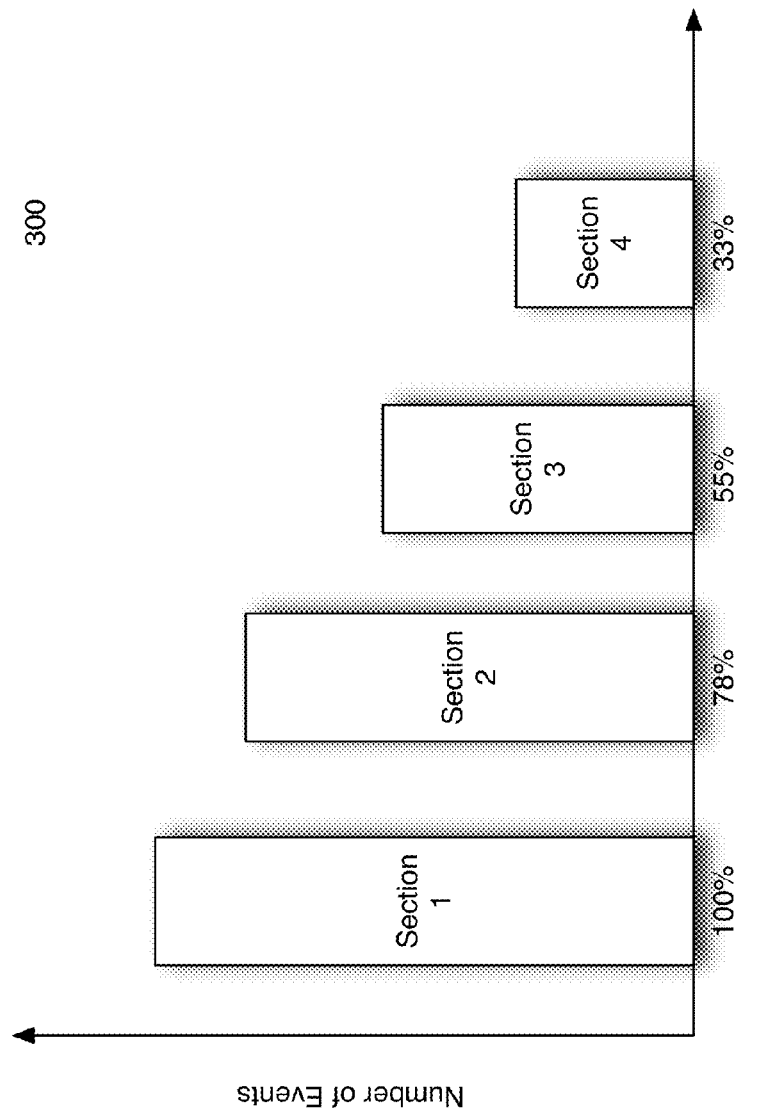
FIG. 3 illustrates an exemplary graph representing user retention performance data.

FIGS. 3-12 illustrate different types of performance data. The data presented in the graphs is for illustration purposes only. FIG. 3 illustrates an exemplary graph 300 representing user retention performance data. User retention data is used to identify whether there is a particular point in a fixed sequence segment where users abandon the segment. The package analysis system 120 can generate user retention performance data by analyzing the set of events for a fixed sequence segment to identify the number of unique views per section. Because user retention data is concerned with unique views, if a user views a section multiple times, e.g. the user restarted the segment or backed up, the user's view is only counted once for a section.

The package analysis system 120 can include one or more rules for recommending a change to the content package based on the user retention performance data. For example, a rule can recommend a change in the number of sections in the segment when the drop-off rate between subsequent sections exceeds a predefined threshold value. In some cases, the threshold value can be defined per section. For example, the system can include one threshold drop-off rate between sections 1 and 2, such as 30%, and another between sections 2 and 3, such as 25%. In another example, a rule can recommend a change to a section when a drop off rate between the first section and the last section exceeds a predefined threshold value. In yet another example, a rule can recommend a change to a segment when the number or percentage of unique views for a section falls below a specified threshold value. In a further example, a rule can recommend a change to a segment when the drop off rate aggregated over multiple sections exceeds a threshold value.

With respect to FIG. 3 and the subsequent drawings, several exemplary rules are presented and discussed. These rules are presented by way of example to illustrate certain aspects of the present technology and not by way of limitation. Therefore, additional rules for generating recommendations based on performance data are contemplated by the present disclosure.

Figure 4:
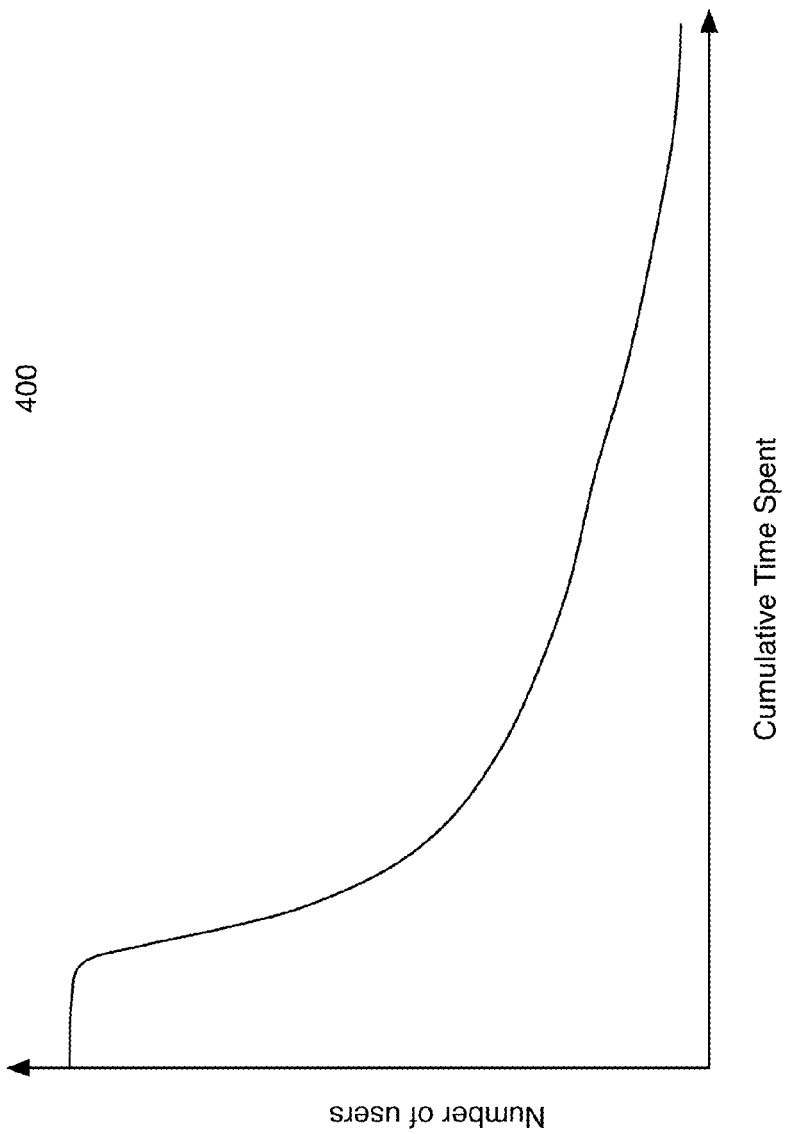
FIG. 4 illustrates an exemplary graph representing cumulative time spent drop off performance data.

FIG. 4. Illustrates an exemplary graph 400 representing cumulative time spent drop off performance data. Cumulative time spent drop off data is used to identify whether there is a particular length of time that results in user abandonment. In some cases, the package analysis system 120 can generate the cumulative time spent drop off performance data for a segment. However, the system can also generate cumulative time spent drop off performance data for the content package as a whole. The package analysis system 120 can include one or more rules for recommending a change based on cumulative time spent drop off performance data. For example, a rule can recommend a change when the cumulative time spent drop off occurs at a rate that exceeds a predefined threshold value. In another example, a rule can recommend a change when the cumulative time spent falls below a specified threshold value. In yet another example, a rule can recommend a change when the number of users at a specified time marker is below a pre-defined threshold value.

Figure 5:
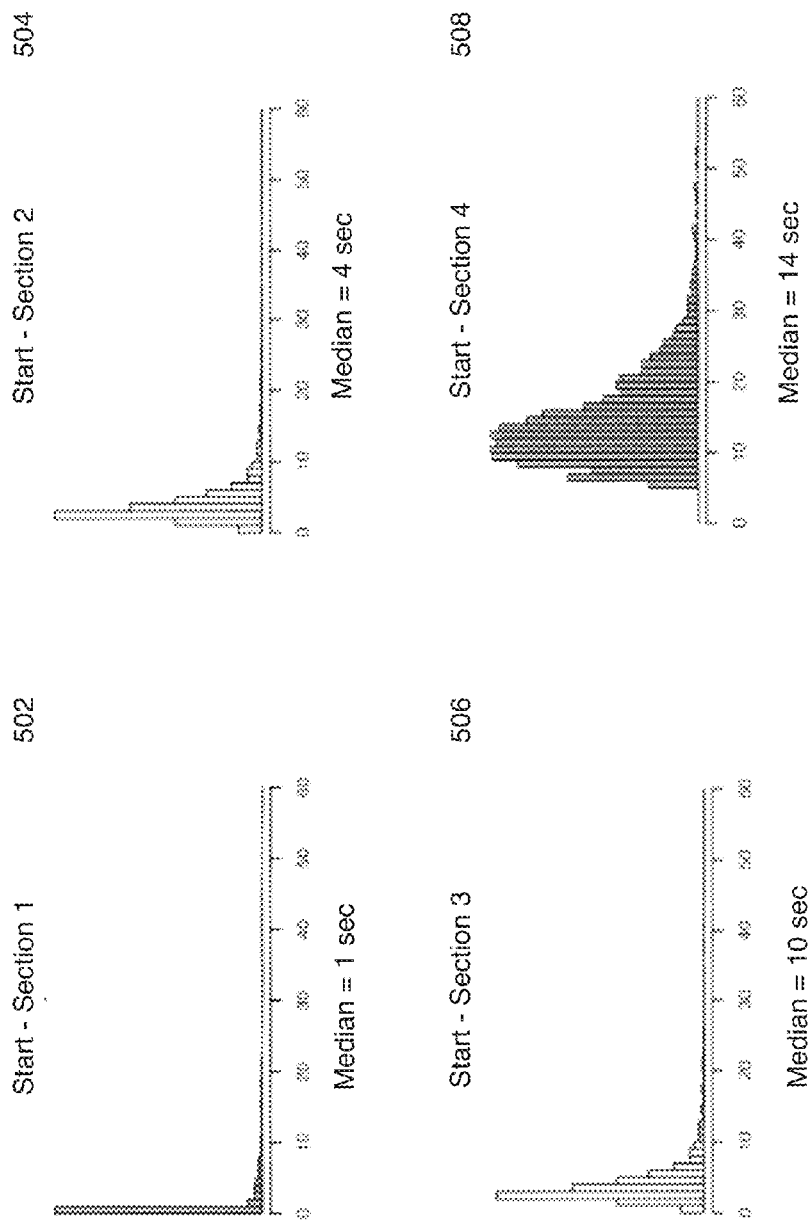
FIG. 5 illustrates exemplary graphs representing absolute time to event performance data.

FIG. 5 illustrates exemplary graphs 502, 504, 506, and 508 representing absolute time to event performance data for four sections. Absolute time to event data represents the absolute length of time from the start of the fixed sequence segment until the particular section is loaded. The package analysis system 120 can include one or more rules for recommending a change based on the absolute time to event performance data. For example, the rule can recommend a change in a component in the segment, a change in file size, or a change in encoding quality when the absolute time to event for one or more sections exceeds a predefined threshold value.

In some embodiments, the package analysis system 120 can further refine the absolute time to event performance data to focus on different characteristics of the event. For example, if the graph had multiple peaks then the package analysis system 120 can analyze the set of events to determine whether a particular device type is taking longer to load. If that is the case, then the package analysis system 120 can recommend modifications that are specific to the identified device type, such as a presentation rule modification.

In some cases, the absolute time to event performance data can be combined with other performance data to further refine a modification. For example, the package analysis system 120 can combine the absolute time to event performance data with the user retention data to determine whether users are abandoning because the load time is too long or because the segment has too many sections. Depending on the results, the package analysis system 120 can recommend different modifications. For example, if the load time is too long, the package analysis system 120 can recommend a change in file size or encoding quality. However, if the load time is within acceptable bounds, the package analysis system 120 can assume the abandonment is due to the number of sections and recommend a decrease in the number of sections.

Figure 6:
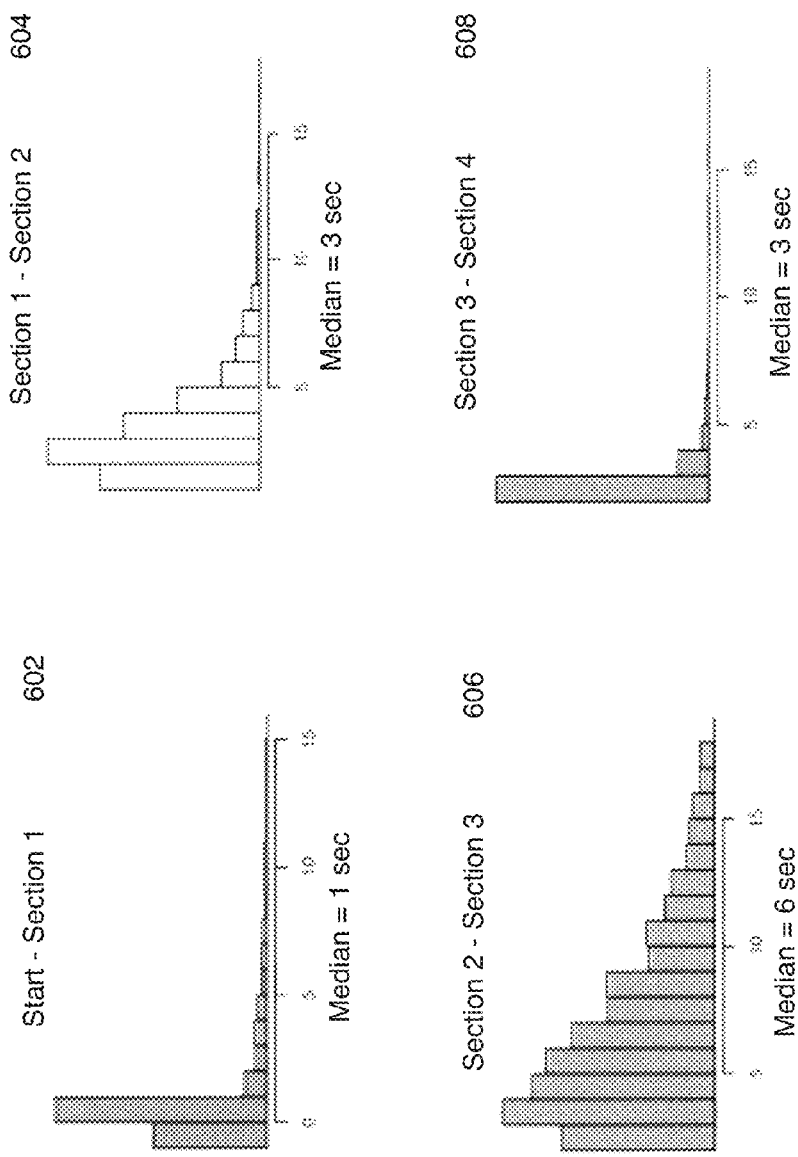
FIG. 6 illustrates exemplary graphs representing relative time to event performance data.

FIG. 6 illustrates an exemplary graph representing relative time to event performance data. Relative time to event data represents the relative length of time from the end of a section to the load of the subsequent section. The package analysis system 120 can include one or more rules for recommending a change based on the relative time to event performance data. For example, the rule can recommend a change in a component in the segment, a change in file size, or a change in encoding quality when the relative time to event for one or more sections exceeds a predefined threshold value.

Similar to the absolute time to event data, the package analysis system 120 can further refine the relative time to event performance data to focus on different characteristics of the event. For example, if the graph had multiple peaks then the package analysis system 120 can analyze the set of events to determine whether a particular device type is taking longer to load. If that is the case, then the package analysis system 120 can recommend modifications that are specific to the identified device type, such as a presentation rule modification.

In some cases, the relative time to event performance data can be combined with other performance data to further refine a modification. For example, the package analysis system 120 can combine the relative time to event performance data with the user retention data to determine whether users are abandoning because the load time is too long or because the segment has too many sections. Depending on the results the package analysis system 120 can recommend different modifications.

Figure 7:
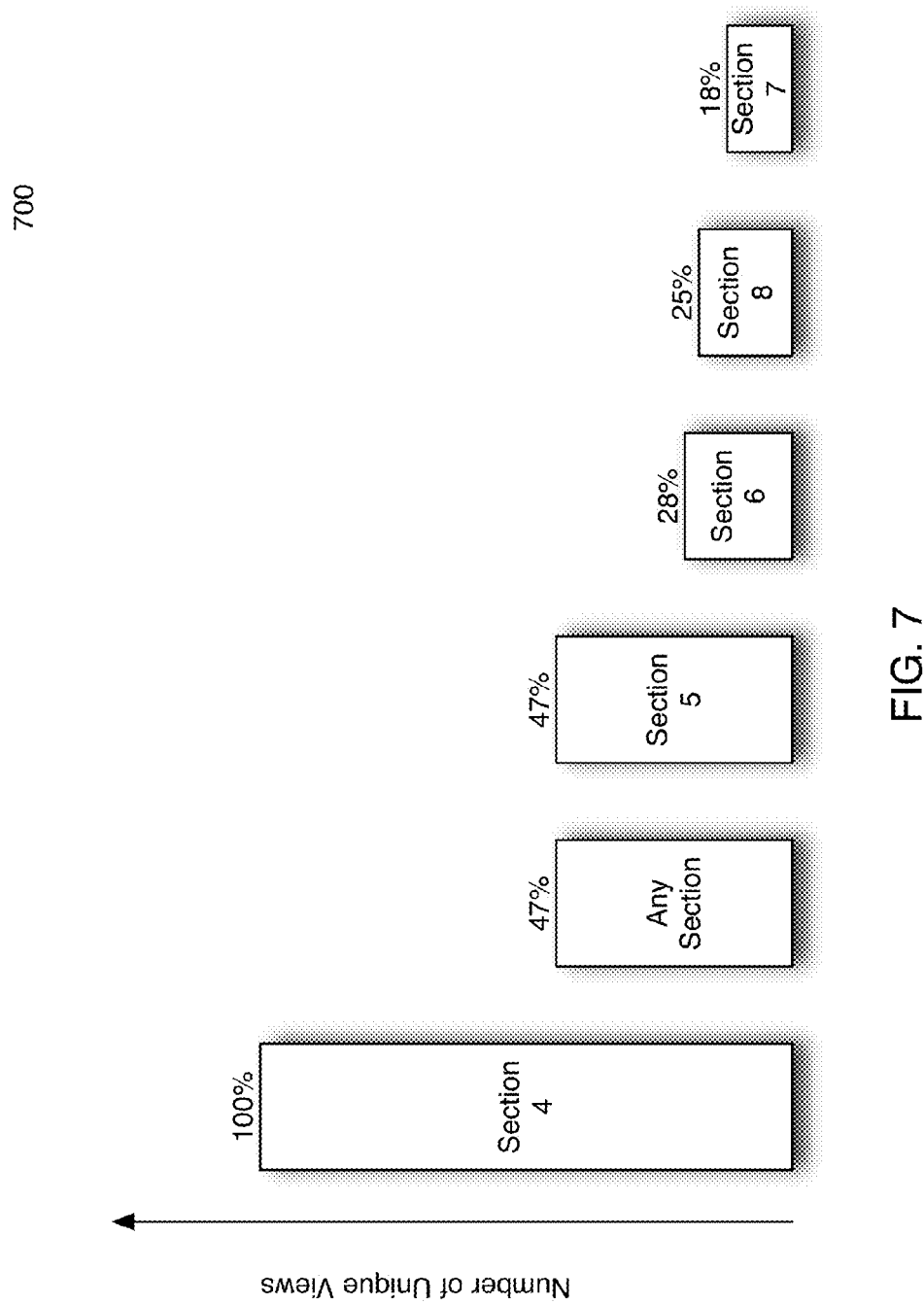
FIG. 7 illustrates an exemplary graph representing unique views per section performance data.

FIG. 7 illustrates an exemplary graph 700 representing unique views per section performance data. The unique views per section data represents the number of unique users that have viewed a particular section in a variable sequence segment. The package analysis system 120 can use the unique views per section data to identify whether one or more sections in a segment have a low view rate. The package analysis system 120 can include one or more rules for recommending a change based on the unique views per section performance data. For example, a rule can recommend a change when the percentage of unique views for a section is below a predefined threshold value. In some cases, the package analysis system 120 can recommend a change to a component of the segment. For example, the package analysis system 120 could recommend a change in layout. That is, if the section with a low view rate requires several user interface actions to get to it, the package analysis system 120 could recommend a layout change so that the section links directly from the landing page. Alternatively, the package analysis system 120 could recommend a change to the link itself, such as a change in the size, or a change in the placement of the link. In another example, a rule can recommend a change when the change in number of unique views between a section and the next most frequently viewed section exceeds a pre-defined threshold value.

Figure 8:
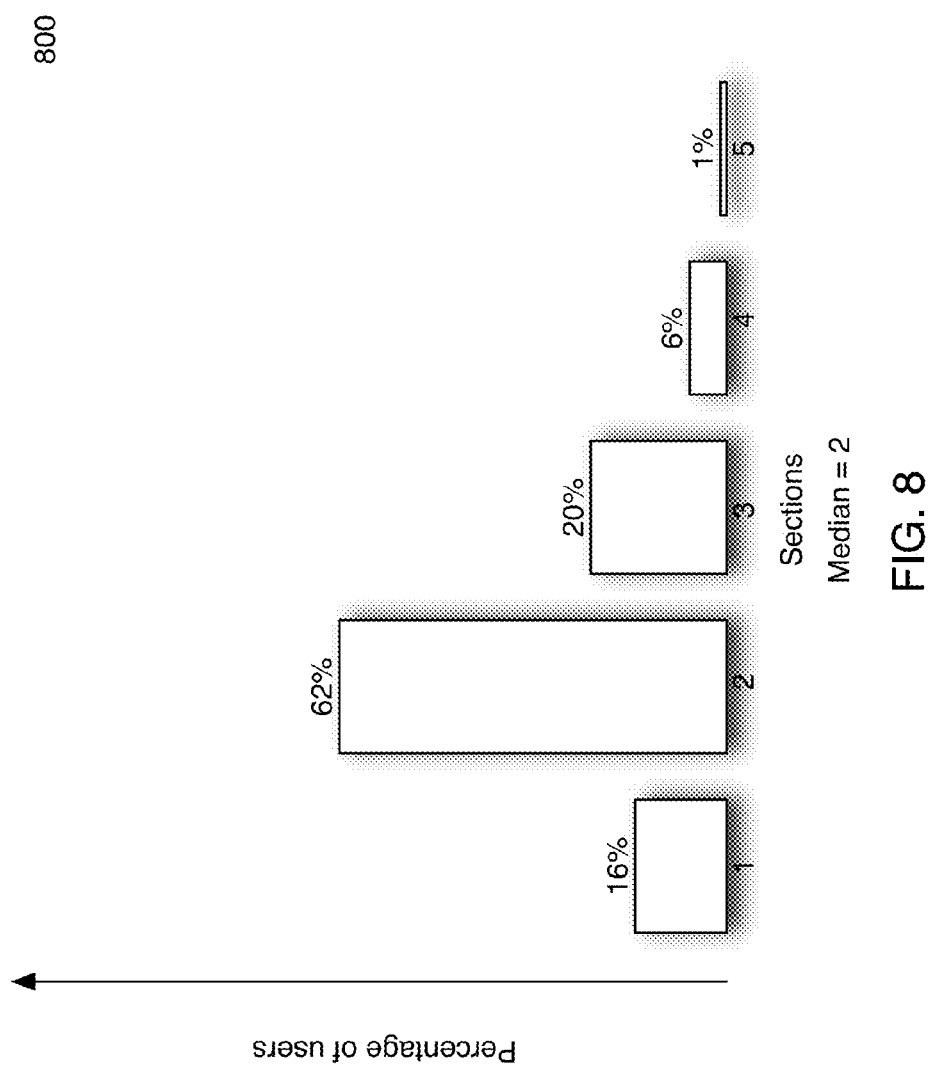
FIG. 8 illustrates an exemplary graph representing number of sections visited performance data.

FIG. 8 illustrates an exemplary graph 800 representing number of sections visited performance data. Number of sections visited data is used to identify the maximum number of sections visited in a variable sequence segment. In some cases, the package analysis system 120 can use the maximum number of segments performance data to determine whether the segment has too many sections. The package analysis system 120 can include one or more rules for recommending a change based on the number of sections visited performance data. For example, a rule can recommend a change in the number of sections in the segment when the difference between the percentage of users associated with the median number of sections visited and the percentage of users associated with the maximum number of sections visited exceeds a predefined threshold value. In another example, a rule can recommend a change when the median number of sections visited is below a pre-defined value. In yet another example, a rule can recommend a change when the percentage of users associated with the median number of sections visited is below a pre-defined threshold value. In some cases, a rule is not limited to median and/or maximum number of sections, but can be based on any percentile associated with number of sections visited.

Figure 9:
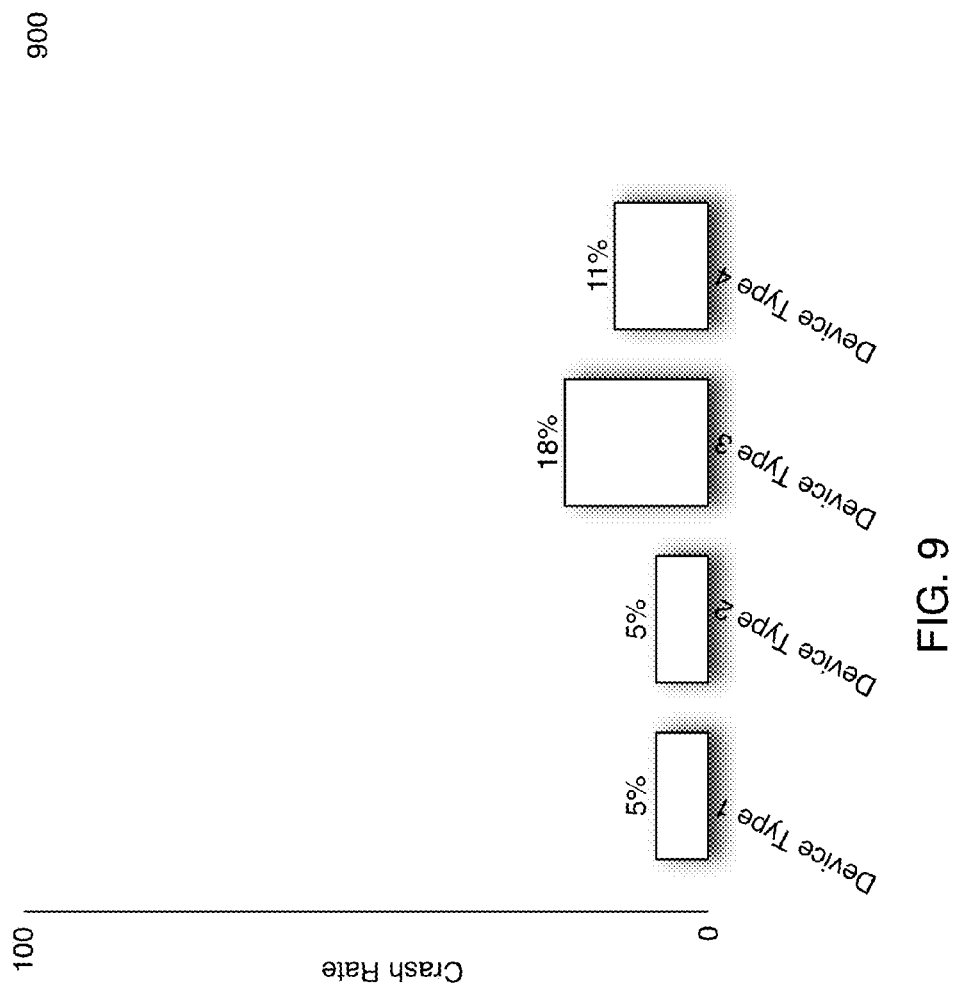
FIG. 9 illustrates an exemplary graph representing crash rate by device performance data.

FIG. 9 illustrates an exemplary graph 900 representing crash rate by device performance data. In some cases, an event can be a user initiated close event, such as a user clicking exit, a user clicking on a close button, or a user performing some other user interface action intended to result in a close event. However, in some cases, a content package can exit through a non-user initiated event such as the content package crashing because it ran out of memory. Crash rate data is used to determine how frequently the content package exits through an error, as opposed to a user initiated action, for each device type. The package analysis system 120 can use the crash rate data to identify whether a content package has performance problems on a particular device type. The package analysis system 120 can include one or more rules for recommending a change based on the crash rate performance data. For example, a rule can recommend a change in memory usage when presented on a particular client device type if the crash rate for the particular device type is above a specified threshold value. In another example, a rule can recommend not presenting the content package on a particular client device type if the crash rate for the particular device type is above a pre-defined threshold value. In yet another example, a rule can recommend a change if the crash rate is above a pre-defined threshold value for all client device types. In a further example, a rule can recommend a change if the difference in the crash rate for the best performing client device type and the crash rate for another client device type exceeds a pre-defined threshold value.

Figure 10:
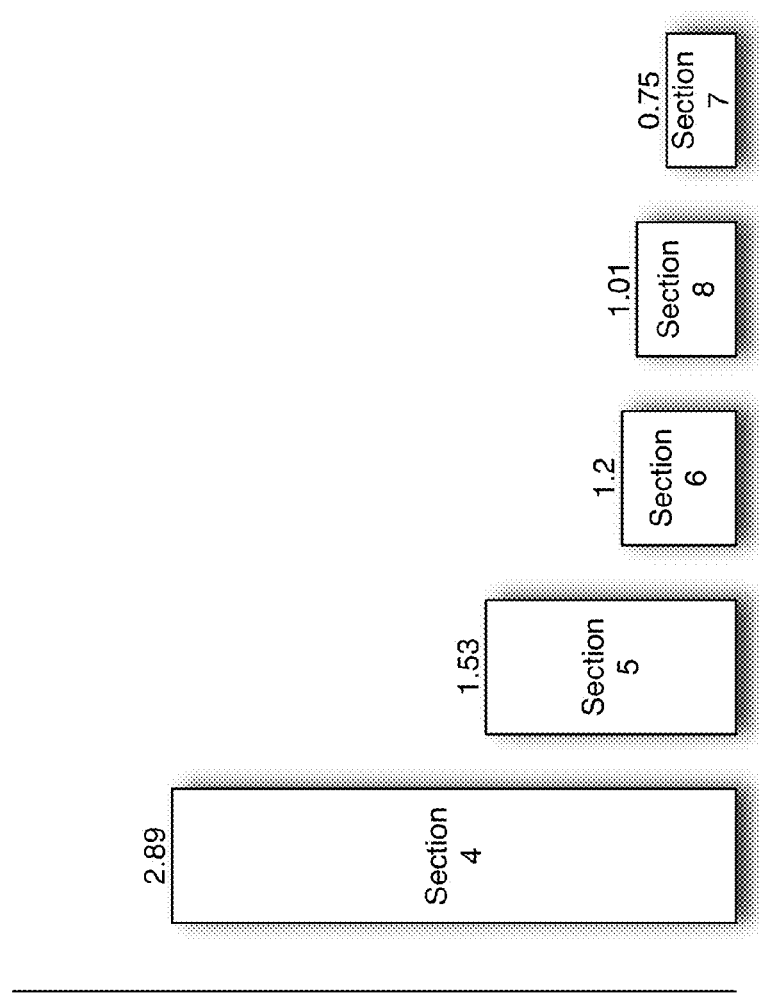
FIG. 10 illustrates an exemplary graph representing gestures per section performance data.

FIG. 10 illustrates an exemplary graph 1000 representing gestures per section performance data. Gestures per section data represents the level of user interaction with a section. In some cases, the package analysis system 120 can use the gestures per section performance data to determine whether a section has lower than expected activity. The package analysis system 120 can include one or more rules for recommending a change based on the gestures per section performance data. For example, a rule can recommend a change to the content of the section or a rule can recommend removal of the section if the number of gestures is below a threshold value.

Figure 11:
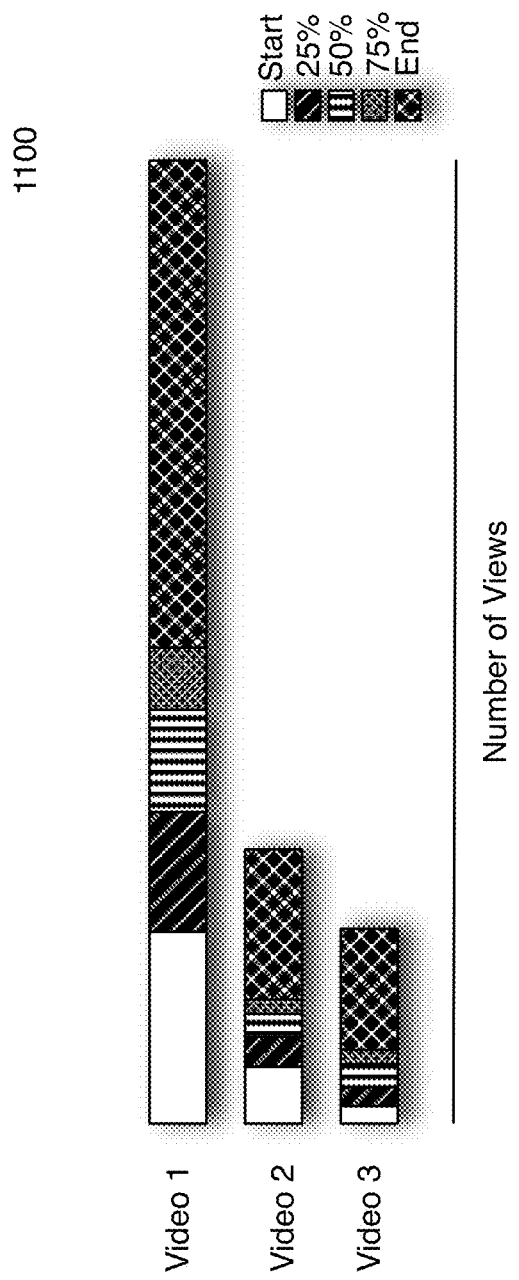
FIG. 11 illustrates an exemplary graph representing video viewing performance data.

FIG. 11 illustrates an exemplary graph 1100 representing video viewing performance data. Video viewing data is used to identify poorly performing video by examining the point at which users abandon the video. That is, video viewing data represents the number of users that started the video versus the number of views that made it to the various video sections, such as the start section, 25% section, 50% section, 75% section, and 100% section. The package analysis system 120 can include one or more rules for recommending a change based on the video viewing performance data. For example, a rule can recommend that the video sequence should be shortened, swapped with another video, or even removed if the percentage of users that complete a video after starting it is below a threshold value. In another example, a rule can recommend a change if the number of users starting a video is below a pre-defined threshold value. In yet another example, a rule can recommend a change if the number of users that make it to a particular section is below a pre-defined threshold value. In a further example, a rule can recommend a change if the difference between the number of users that make it to one section and the number of users that make it to a subsequent section exceeds a threshold value.

Figure 12:
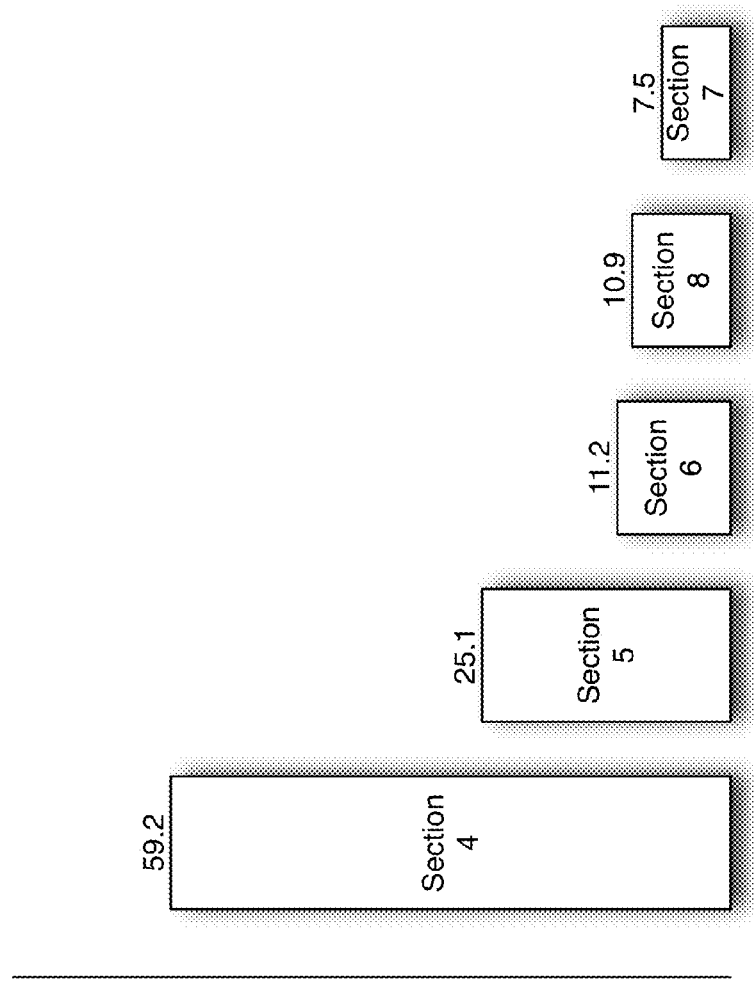
FIG. 12 illustrates an exemplary graph representing average time spent per section performance data.

FIG. 12 illustrates an exemplary graph 1200 representing average time spent per section performance data. Average time spent per section data represents the amount of time users are spending in any particular section in a segment. In some cases, the package analysis system 120 can use the average time spent per section performance data to determine whether users are spending less time than expected in a section. The package analysis system 120 can include one or more rules for recommending a change based on the average time spent per section performance data. For example, a rule can recommend a change to the content of a section or a rule can recommend removal of a section if the average time spent is below a predefined threshold value. In another example, a rule can recommend a change if the difference in time spent in a section and the average time spent across all sections exceeds a threshold value. In yet another example, a rule can recommend a change to a segment to make the links to a section more prominent, such as by changing the placement, color, size, text, if the average time spent in the section is above a predefined threshold value.

In some embodiments, the package analysis system 120 can further refine the average time spent per section performance data to focus on different characteristics of the events. For example, the package analysis system 120 can analyze the set of events to examine the average time spent for a particular device type to determine whether a particular device type is performing better or worse than all device types as whole. If that is the case, then the package analysis system 120 can recommend modifications that are specific to the identified device type, such as a presentation rule modification. In another example, the package analysis system 120 can analyze the set of events to differentiate between average time spent interacting with active invitational content versus passive invitational content. The package analysis system 120 can analyze other characteristics as well.

Figure 13:
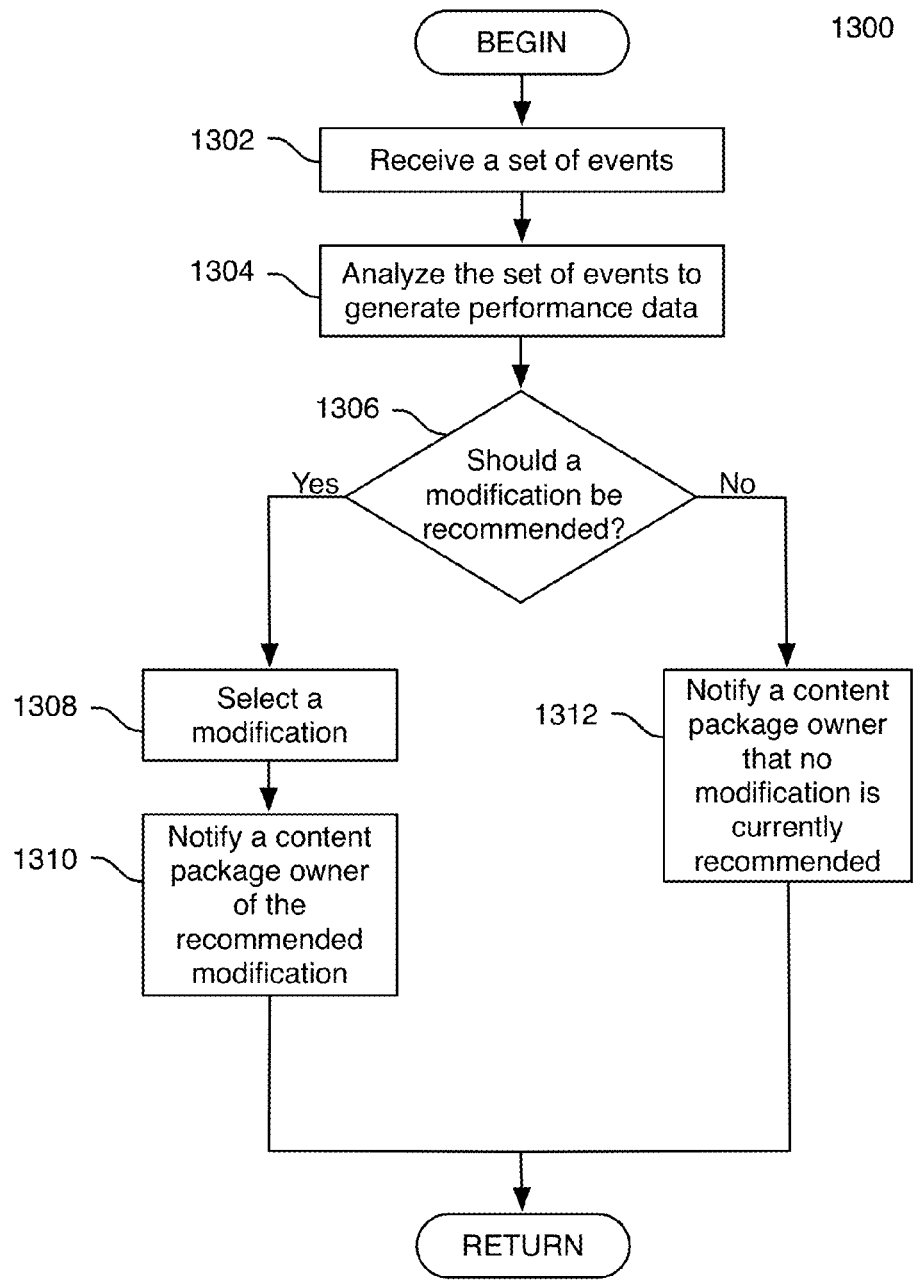
FIG. 13 illustrates an exemplary method embodiment for optimizing a content package.

FIG. 13 is a flowchart illustrating an exemplary method 1300 for optimizing a content package. For the sake of clarity, this method is discussed in terms of an exemplary package analysis system such as is shown in FIG. 1. Although specific steps are shown in FIG. 13, in other embodiments a method can have more or less steps than shown. The content package modification process begins at step 1302 where the package analysis system receives, from one or more client devices, a set of events associated with a content package. The package analysis system can receive the set of events in response to a variety of different user interactions with a content package, such as a view, a gesture, a conversion, and/or a video event. The content package is divided into one or more segments. In some embodiments, the content package includes at least one fixed sequence segment and at least one variable sequence segment.

After receiving the set of events, the package analysis system can analyze the set of events to generate performance data (step 1304). In some embodiments, the performance data includes user retention data, cumulative time spent drop off data, absolute time to event data, relative time to event data, unique views per section data, number of sections visited data, average time spent per section data, view path data, exit views data, crash rate by device data, gestures per section data, and/or video viewing data. Using one or more rules, the package analysis system can map the performance data to one or more modifications to determine whether a modification to a segment should be recommended (step 1306). In some embodiments, a modification is a change in file size, a change in encoding quality, a change in a component, and/or a change in a presentation rule. In some cases, the package analysis system can determine that a recommendation should not be made because the performance data does not map to a modification. For example, if the content package is performing within the desired bounds, then the package analysis system can determine that no modification is currently required.

In some cases, after determining that a modification should be recommended, the package analysis system can select a modification or a subset of modifications from the one or more identified modifications (step 1308). After selecting one or more modifications, the package analysis system can notify a content package owner of the recommended modification(s) (step 1310). In some cases, after determining that no change should be recommended, the package analysis system can notify a content package owner that no change is currently recommended (step 1312). After completing step 1310 or step 1312, the package analysis system resumes previous processing, which can include repeating method 1300.

Figure 14:
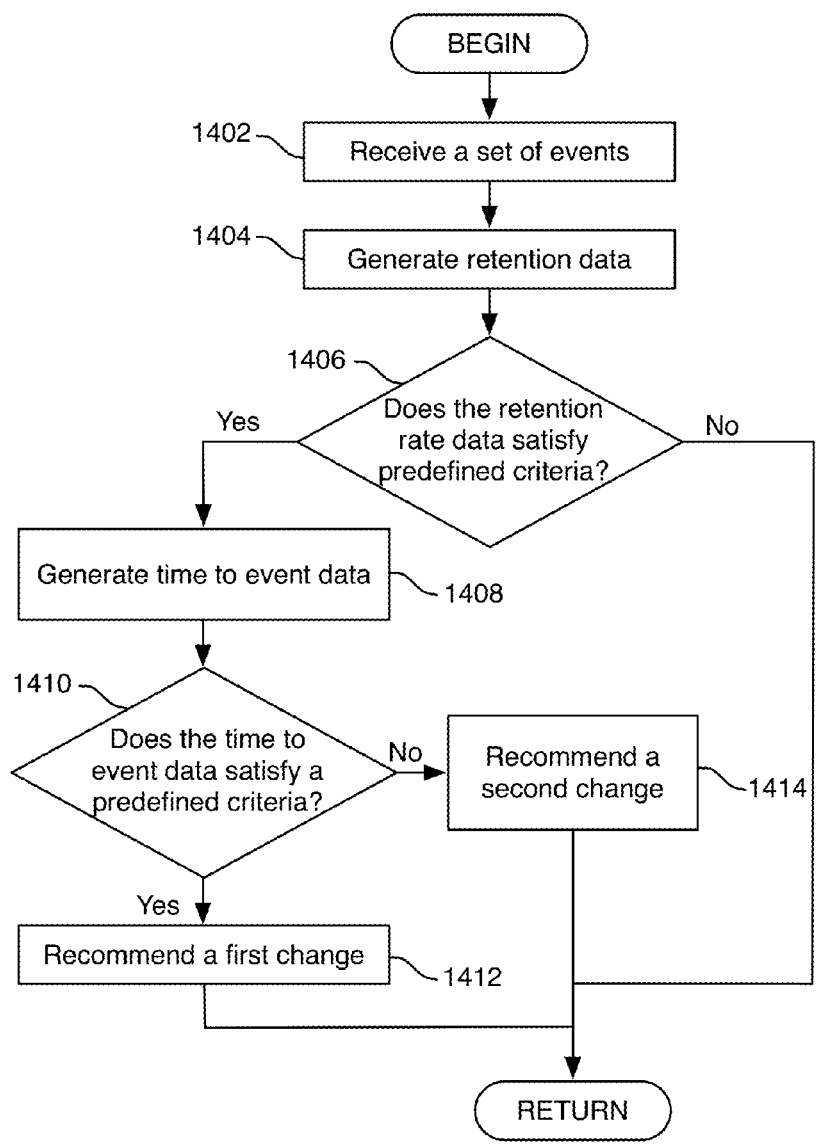
FIG. 14 illustrates an exemplary method embodiment for recommending a modification based on user retention performance data.

FIG. 14 is a flow chart illustrating an exemplary method 1400 for recommending a modification based on user retention performance data. For the sake of clarity, this method is discussed in terms of an exemplary package analysis system such as is shown in FIG. 1. Although specific steps are shown in FIG. 14, in other embodiments a method can have more or less steps than shown. The content package modification process begins at step 1402 where the package analysis system receives a set of events associated with a fixed sequence segment in a content package. After receiving the set of events, the content delivery system analyzes the events to generate user retention data (step 1404). Based on the generated user retention data, package analysis system identifies whether retention rate data satisfies some predefined criteria (step 1406). For example, the package analysis system can identify a section where the change in the retention rate from the preceding section is the greatest. If the retention rate data does satisfy the predefined criteria, the package analysis system generates absolute time to event performance data and/or relative time to event performance data for the identified section (step 1408) and checks if the time to event data satisfies predefined time to event criteria (step 1410). For example, the package analysis system can check if a section identified through the retention rate data has a time to event value that exceeds a threshold value. If so, the package analysis system recommends a first change (step 1412). In some embodiments, the recommendation includes a change in file size, a change in encoding quality, and/or a change in presentation rules. If the time to event performance data does not satisfy the predefined criteria, the package analysis system recommends a second change (step 1414). In some embodiments, the recommendation is a change in the number of sections in the segment. After making any necessary recommendations, the package analysis system resumes previous processing, which can include repeating method 1400.

Figure 15:
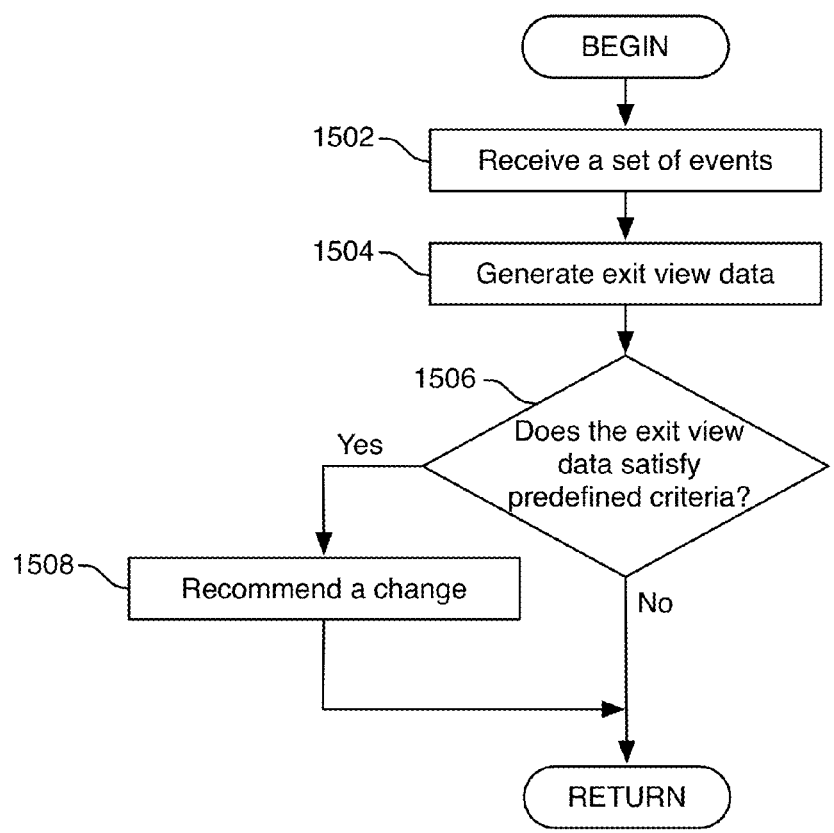
FIG. 15 illustrates an exemplary method embodiment for recommending a modification based on exit view performance data.

FIG. 15 is a flowchart illustrating an exemplary method 1500 for recommending a modification based on exit view performance data. Exit view data represents where users exit the content package. That is, the section viewed last by a user. Exit view data can be used to identify sections where users may find the content and/or interface to be less desirable. For the sake of clarity, this method is discussed in terms of an exemplary package analysis system such as is shown in FIG. 1. Although specific steps are shown in FIG. 15, in other embodiments a method can have more or less steps than shown. The content package modification process begins at step 1502 where the package analysis system receives a set of events associated with a content package. After receiving the set of events, the package analysis system analyzes the events to generate exit view data (step 1504). Based on the generated exit view data, the package analysis system determines whether the exit view data satisfies predefined criteria (step 1506). For example, the package analysis system can identify the section with the greatest drop off rate and then check if that drop off rate exceeds a predefined threshold value. If the exit view data does satisfy the predefined threshold value, the package analysis system recommends a change (step 1508). In some embodiments, the change is a change to a component of the identified section. After making any necessary recommendations, the package analysis system resumes previous processing, which can include repeating method 1500.

Figure 16:
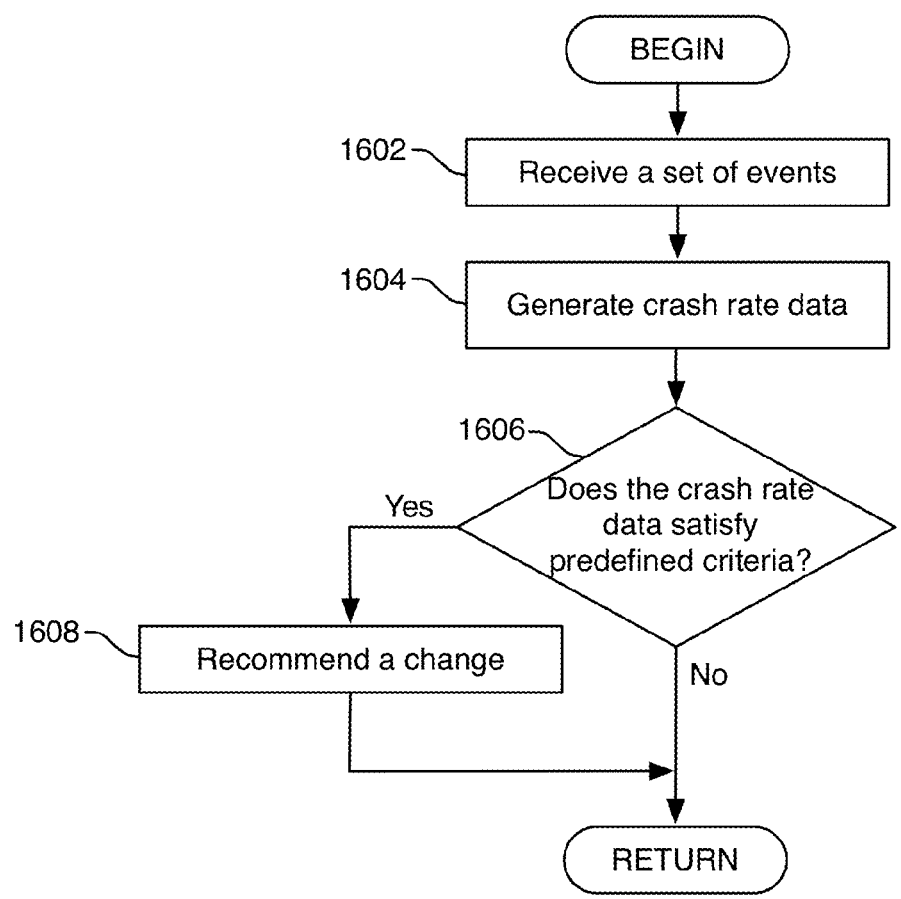
FIG. 16 illustrates an exemplary method embodiment for recommending a modification based on crash rate performance data.

FIG. 16 is a flowchart illustrating an exemplary method 1600 for recommending a modification based on crash rate performance data. For the sake of clarity, this method is discussed in terms of an exemplary package analysis system such as is shown in FIG. 1. Although specific steps are shown in FIG. 16, in other embodiments a method can have more or less steps than shown. The content package modification process begins at step 1602 where the package analysis system receives a set of events associated with a content package. After receiving the set of events, the package analysis system analyzes the events to generate crash rate data (step 1604). The package analysis system then determines whether the crash rate data satisfies predefined criteria (step 1606). For example, the package analysis system can check whether the crash rate for a particular device is above a predefined threshold value. If the crash rate data does satisfy the criteria, the package analysis system recommends a change (step 1608). In some cases, the change is specific to a client device type. In some embodiments, the change is a change in memory usage for the content package when presented on the client device type. After completing any recommendations, the package analysis system resumes previous processing, which can include repeating method 1600.

Figure 17:
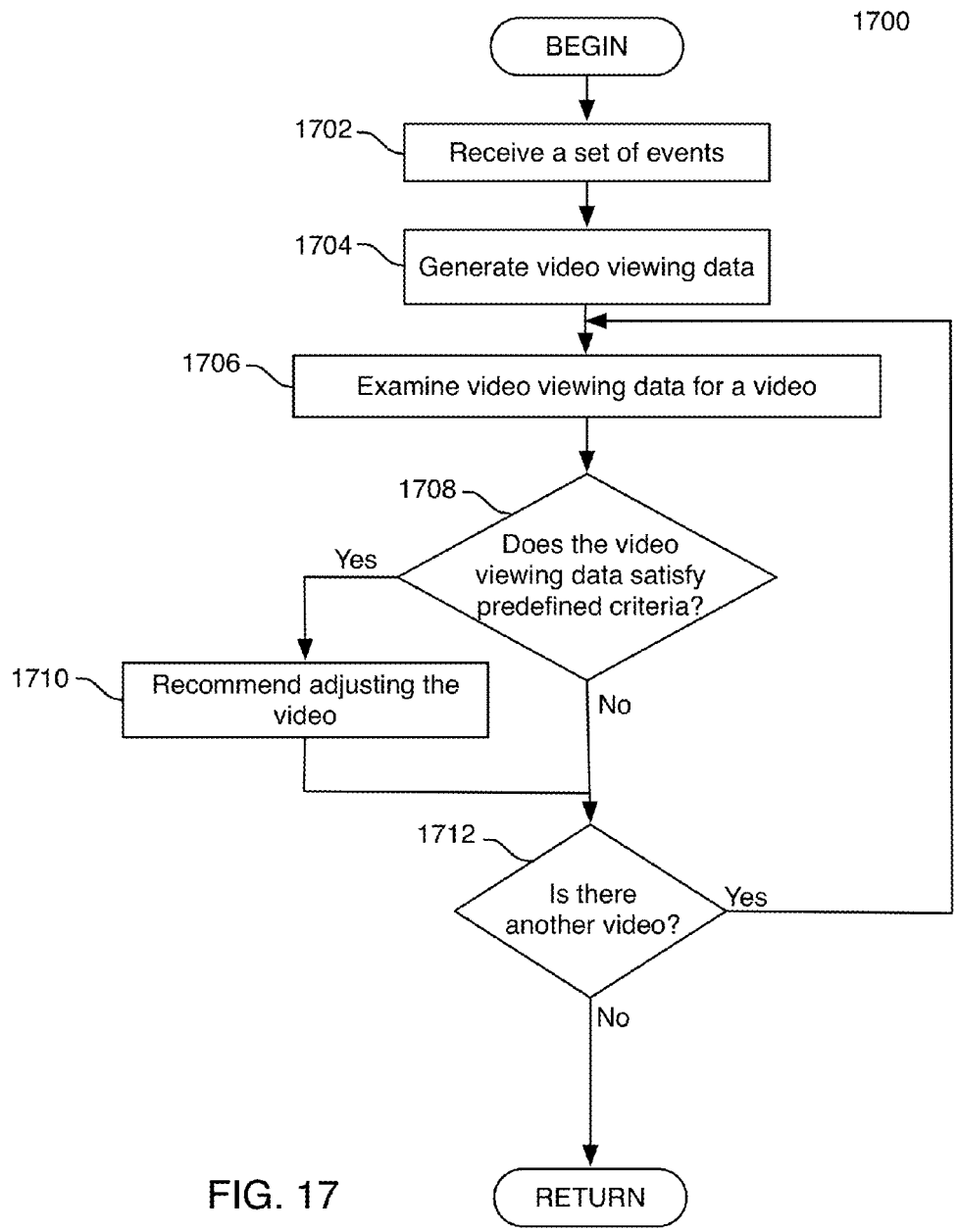
FIG. 17 illustrates an exemplary method embodiment for recommending a modification based on video viewing performance data.

FIG. 17 is a flowchart illustrating an exemplary method 1700 for recommending a modification based on video viewing performance data. For the sake of clarity, this method is discussed in terms of an exemplary package analysis system such as is shown in FIG. 1. Although specific steps are shown in FIG. 17, in other embodiments a method can have more or less steps than shown. The content package modification process begins at step 1702 where the package analysis system receives a set of events associated with a content package. After receiving the set of events, the package analysis system analyzes the events to generate video viewing data (step 1704). The package analysis system examines the video viewing data for a video (step 1706) and checks if it satisfies predefined criteria (step 1708). For example, the package analysis system can compute the difference between the number of users that started the video and the number of users that completed the video for a specific video and then check if the difference exceeds a predefined threshold value. If the video viewing data for the video satisfies the predefined criteria, the package analysis system recommends adjusting the video (1710). In some embodiments, adjusting the video includes removing the video, changing the length of the video, and/or swapping the video with a different video in the content package. After completing any recommendations, the content delivery system checks if there is another video to examine (step 1712). If so, the content delivery system repeats the recommendation process at step 1708. Once the video viewing data for all of the devices has been examined, the package analysis system resumes previous processing, which an include repeating method 1700.

Figure 18:
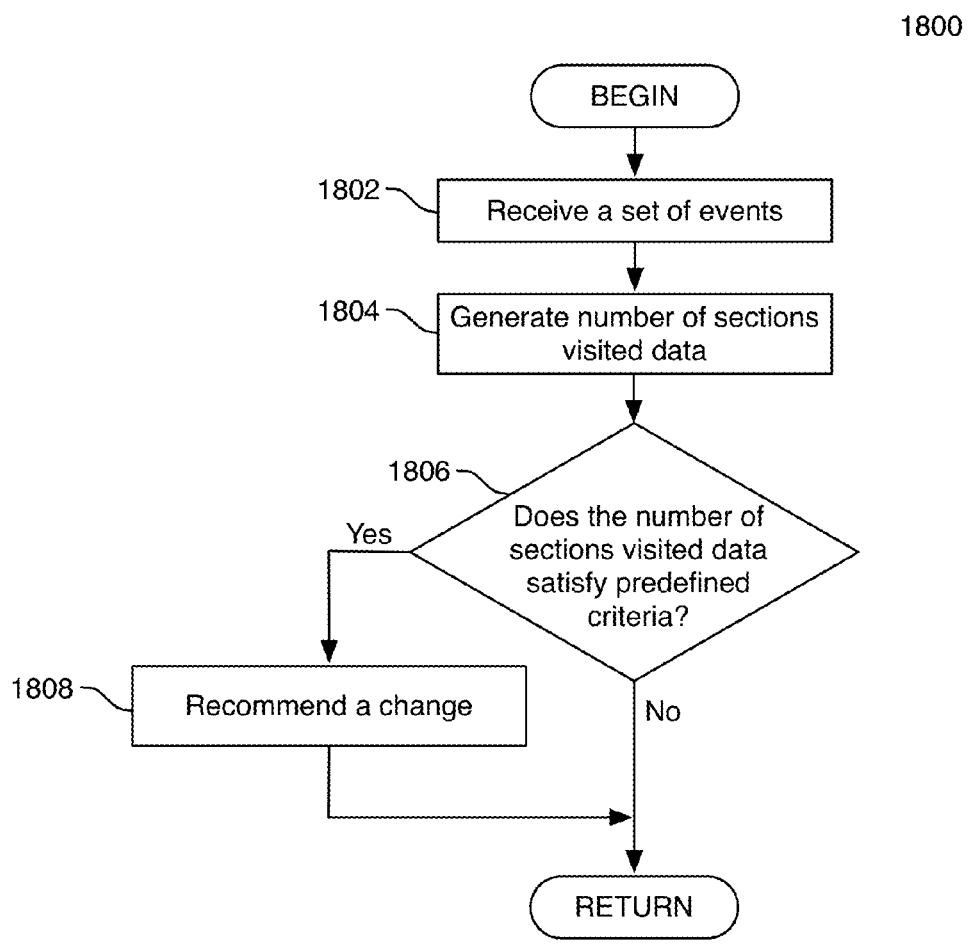
FIG. 18 illustrates an exemplary method embodiment for recommending a modification based on number of sections visited performance data.

FIG. 18 is a flowchart illustrating an exemplary method 1800 for recommending a modification based on number of sections visited performance data. For the sake of clarity, this method is discussed in terms of an exemplary package analysis system such as is shown in FIG. 1. Although specific steps are shown in FIG. 18, in other embodiments a method can have more or less steps than shown. The content package modification process begins at step 1802 where the package analysis system receives a set of events associated with a variable sequence segment in a content package. After receiving the set of events, the package analysis system analyzes the events to generate unique views per section performance data (step 1804). The package analysis system checks if the number of sections visited data satisfies predefined criteria (step 1806). For example, based on the number of sections visited data, the package analysis system can compute the media number of sections visited. Additionally, the package analysis system can compute the difference between the percentage of users associated with the fewest number of sections visited and the percentage of users associated with the maximum number of sections visited. Then after computing the difference, the package analysis system can check if the difference exceeds a predefined threshold value. If the number of sections visited data satisfies predefined criteria, the package analysis system recommends a change (step 1808). After making any necessary recommendations, the package analysis system resumes previous processing, which can include repeating method 1800.

Figure 19:
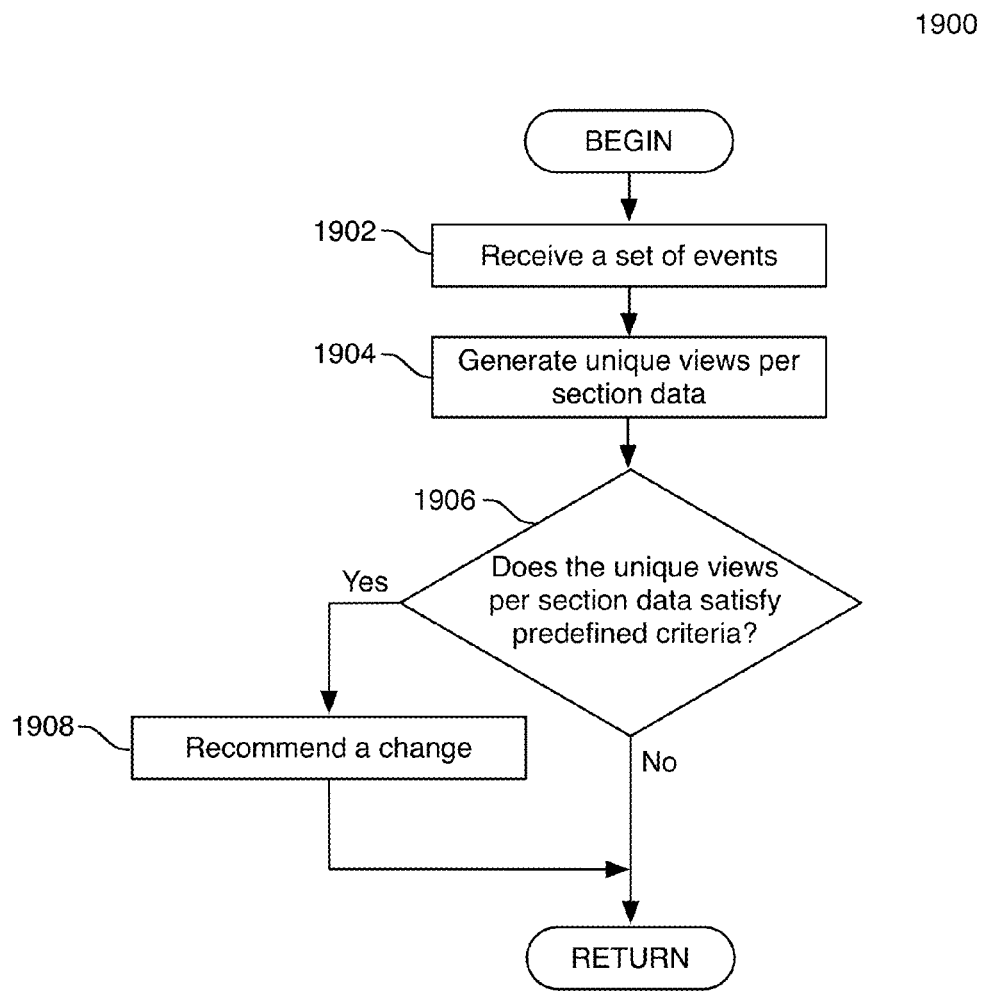
FIG. 19 illustrates an exemplary method embodiment for recommending a modification based on unique views per section performance data.

FIG. 19 is a flowchart illustrating an exemplary method 1900 for recommending a modification based on unique views per section performance data. For the sake of clarity, this method is discussed in terms of an exemplary package analysis system such as is shown in FIG. 1. Although specific steps are shown in FIG. 19, in other embodiments a method can have more or less steps than shown. The content package modification process begins at step 1902 where the package analysis system receives a set of events associated with a variable sequence segment in a content package. After receiving the set of events, the package analysis system analyzes the events to generate unique views per section performance data (step 1904). After generating the performance data, the package analysis system checks if the unique views per section data satisfy predefined criteria (step 1906). For example, using the unique views per section performance data, the package analysis system can identify the section with the fewest number of unique views and checks if the number falls below a predefined threshold value. If the unique views per section data does satisfy predefined criteria, the package analysis system recommends a change (step 1908). In some embodiments, the change can be a change to a component of the segment, such as a change to the layout of the segment. After making any necessary recommendations, the package analysis system resumes previous processing, which can include repeating method 1900.

Figure 20:
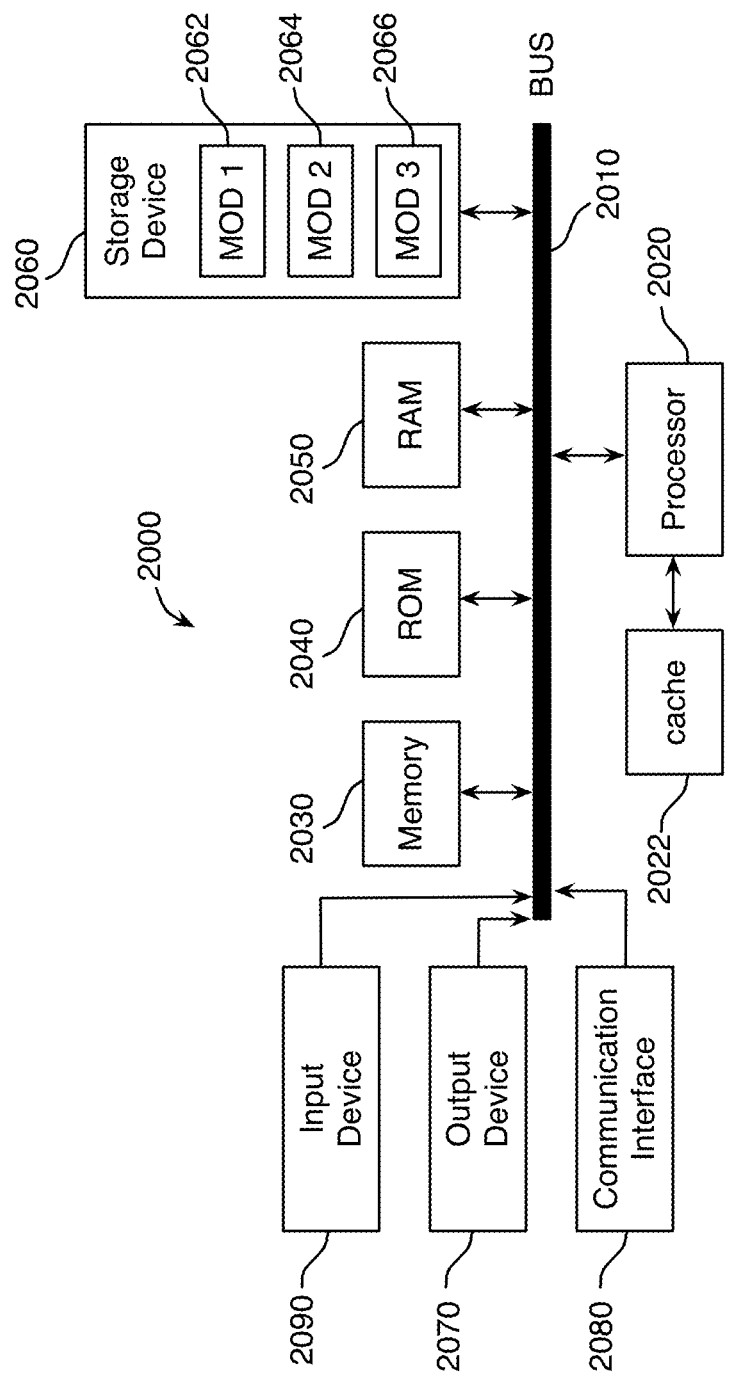
FIG. 20 illustrates an example system embodiment.

With reference to FIG. 20, an exemplary system 2000 includes a general-purpose computing device 2000, including a processing unit (CPU or processor) 2020 and a system bus 2010 that couples various system components including the system memory 2030 such as read only memory (ROM) 2040 and random access memory (RAM) 2050 to the processor 2020. The system 2000 can include a cache 2022 connected directly with, in close proximity to, or integrated as part of the processor 2020. The system 2000 copies data from the memory 2030 and/or the storage device 2060 to the cache for quick access by the processor 2020. In this way, the cache provides a performance boost that avoids processor 2020 delays while waiting for data. These and other modules can control or be configured to control the processor 2020 to perform various actions. Other system memory 2030 may be available for use as well. The memory 2030 can include multiple different types of memory with different performance characteristics. It can be appreciated that the disclosure may operate on a computing device 2000 with more than one processor 2020 or on a group or cluster of computing devices networked together to provide greater processing capability. The processor 2020 can include any general purpose processor and a hardware module or software module, such as module 1 2062, module 2 2064, and module 3 2066 stored in storage device 2060, configured to control the processor 2020 as well as a special-purpose processor where software instructions are incorporated into the actual processor design. The processor 2020 may essentially be a completely self-contained computing system, containing multiple cores or processors, a bus, memory controller, cache, etc. A multi-core processor may be symmetric or asymmetric.

The system bus 2010 may be any of several types of bus structures including a memory bus or memory controller, a peripheral bus, and a local bus using any of a variety of bus architectures. A basic input/output (BIOS) stored in ROM 2040 or the like, may provide the basic routine that helps to transfer information between elements within the computing device 2000, such as during start-up. The computing device 2000 further includes storage devices 2060 such as a hard disk drive, a magnetic disk drive, an optical disk drive, tape drive or the like. The storage device 2060 can include software modules 2062, 2064, 2066 for controlling the processor 2020. Other hardware or software modules are contemplated. The storage device 2060 is connected to the system bus 2010 by a drive interface. The drives and the associated computer readable storage media provide nonvolatile storage of computer readable instructions, data structures, program modules and other data for the computing device 2000. In one aspect, a hardware module that performs a particular function includes the software component stored in a non-transitory computer-readable medium in connection with the necessary hardware components, such as the processor 2020, bus 2010, display 2070, and so forth, to carry out the function. The basic components are known to those of skill in the art and appropriate variations are contemplated depending on the type of device, such as whether the device 2000 is a small, handheld computing device, a desktop computer, or a computer server.

Although the exemplary embodiment described herein employs the hard disk 2060, it should be appreciated by those skilled in the art that other types of computer readable media which can store data that are accessible by a computer, such as magnetic cassettes, flash memory cards, digital versatile disks, cartridges, random access memories (RAMs) 2050, read only memory (ROM) 2040, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 2000, an input device 2090 represents any number of input mechanisms, such as a microphone for speech, a touch-sensitive screen for gesture or graphical input, keyboard, mouse, motion input, speech and so forth. An output device 2070 can also be one or more of a number of output mechanisms known to those of skill in the art. In some instances, multimodal systems enable a user to provide multiple types of input to communicate with the computing device 2000. The communications interface 2080 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 2020. The functions these blocks represent may be provided through the use of either shared or dedicated hardware, including, but not limited to, hardware capable of executing software and hardware, such as a processor 2020, that is purpose-built to operate as an equivalent to software executing on a general purpose processor. For example the functions of one or more processors presented in FIG. 20 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 2040 for storing software performing the operations discussed below, and random access memory (RAM) 2050 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 2000 shown in FIG. 20 can practice all or part of the recited methods, can be a part of the recited systems, and/or can operate according to instructions in the recited non-transitory computer-readable storage media. Such logical operations can be implemented as modules configured to control the processor 2020 to perform particular functions according to the programming of the module. For example, FIG. 20 illustrates three modules Mod1 2062, Mod2 2064 and Mod3 2066 which are modules configured to control the processor 2020. These modules may be stored on the storage device 2060 and loaded into RAM 2050 or memory 2030 at runtime or may be stored as would be known in the art in other computer-readable memory locations.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A computer implemented method comprising:
   receiving a set of events associated with a package of media content, the package of media content comprising a plurality of media segments;
   based on the set of events, calculating, via a processor, respective performance values for the plurality of media segments, wherein the respective performance values comprise time spent values for the plurality of media segments;
   based on the respective performance values, identifying a media segment from the plurality of media segments having at least one of a lowest time spent value from among the plurality of media segments or a time spent value below an expected time spent value for the media segment;
   when a respective performance value of the identified media segment is below a threshold, determining a modification to the identified media segment based on one or more rules which map performance values to one or more modifications; and
   presenting the package of media content with the modification.

2. The computer implemented method of claim 1, wherein the modification comprises at least one of a change in a size of a content item, a change in an encoding quality associated with the package of media content, a change in a component associated with the package of media content, or a presentation rule.

3. The computer implemented method of claim 1, wherein the modification comprises at least one of a removal of the identified media segment from the package of media content or a re-ordering of content items based on the respective time spent values calculated for the plurality of media segments.

4. A system comprising:
   a processor; and
   a computer readable storage device storing instructions which, when executed by the processor, cause the processor to perform operations comprising:
     collecting a plurality of interaction events associated with a package of media content, the package of media content comprising a plurality of segments;
     based on the plurality of interaction events, calculating respective performance values for the plurality of segments, wherein the respective performance values comprise time spent values for the plurality of media segments;
     based on the respective performance values, identifying a media segment from the plurality of media segments having at least one of a lowest time spent value from among the plurality of media segments or a time spent value below an expected time spent value for the media segment;
     when a respective performance value of the identified media segment is below a threshold, determining a modification to the identified media segment based on one or more rules which map performance values to one or more modifications; and
     presenting the package of media content with the modification.

5. The system of claim 4, wherein an interaction event is collected in response to at least one of a view, a gesture, a conversion, or a video event.

6. The system of claim 4, wherein analyzing comprises generating at least one of user retention data, cumulative time spent drop off data, absolute time to event data, relative time to event data, unique views per section data, number of sections visited data, average time spent per section data, view path data, exit views data, crash rate by device data, gestures per section data, or video viewing data.

7. The system of claim 4, wherein the modification comprises at least one of a change in a size of a content item, a change in an encoding quality associated with the package of media content, a change in a component associated with the package of media content, or a presentation rule.

8. A non-transitory computer-readable storage media storing instructions which, when executed by a computing device, causes the computing device to perform operations comprising:
   receiving a set of events associated with a package of media content, the package of media content comprising a plurality of media segments;
   based on the set of events, calculating respective performance values for the plurality of media segments, wherein the respective performance values comprise time spent values for the plurality of media segments;
   based on the respective performance values, identifying a media segment from the plurality of media segments having at least one of a lowest time spent value from among the plurality of media segments or a time spent value below an expected time spent value for the media segment;
   when a respective performance value of the identified media segment is below a threshold, determining a modification to the identified media segment based on one or more rules which map performance values to one or more modifications; and
   presenting the package of media content with the modification.

9. The non-transitory computer-readable storage medium of claim 8, wherein the modification comprises at least one of a removal of the identified media segment from the package of media content or a re-ordering of content items based on the respective time spent values calculated for the plurality of media segments.

10. The non-transitory computer-readable storage medium of claim 9, wherein the performance data comprises at least one of user retention data, cumulative time spent drop off data, absolute time to event data, relative time to event data, unique views per section data, number of sections visited data, average time spent per section data, view path data, exit views data, crash rate by device data, gestures per section data, or video viewing data.

11. A computer implemented method comprising:
    receiving a set of events associated with a package of media content, the package of media content comprising a plurality of media segments;

based on the set of events, calculating respective time spent values for the plurality of media segments;

based on the respective time spent values, identifying a media segment from the plurality of media segments for modification, the media segment having at least one of a lowest time spent value from among the plurality of media segments or a time spent value below an expected time spent value for the media segment, wherein the modification comprises at least one of a removal of the identified media segment from the package of media content or a re-ordering of content items based on the respective time spent values calculated for the plurality of media segments;

generating a signal comprising an instruction for modifying the package of media content based on the modification.

12. The computer implemented method of claim 11, wherein the media segment is identified based on a lowest time spent value from among the plurality of media segments.

13. The computer implemented method of claim 11, further comprising modifying the package of media content based on the modification.

14. The computer implemented method of claim 11, wherein the modification comprises re-ordering sections of media content associated with the package of media content.

15. The computer implemented method of claim 11, wherein the modification comprises removing the identified segment from the package of media content.

16. The computer implemented method of claim 11, wherein at least part of the plurality of segments comprises videos, and wherein identifying the modification further comprises:

determining that a video adjustment should be made in response to identifying a video where the difference between a percentage of users that completed the video and a percentage of users that started the video is below a specified threshold value.

17. The computer implemented method of claim 11, wherein identifying the modification further comprises:

generating a number of sections visited data for a segment to identify a median number of sections visited, wherein the segment is divided into a plurality of sections; and determining that a decrease in the number of sections in the segment should be recommended when a difference between a first value associated with the median number of sections visited and a second value associated with a maximum number of sections visited exceeds a specified threshold value.

18. The computer implemented method of claim 11, wherein the identifying comprises identifying a modification to a section of the segment, wherein the segment comprises a plurality of sections.

19. A system comprising:

a processor; and a computer-readable storage device having stored therein instructions which, when executed by the processor, cause the processor to perform operations comprising:

sending a package of media content to one or more devices for presentation at the one or more devices, the package comprising a plurality of media segments;

based on data collected from a plurality of interaction events associated with the one or more devices, calculating time spent values corresponding to the package;

analyzing the plurality of interaction events to generate performance data comprising respective time spent values for the plurality of media segments;

based on the respective time spent values, identifying a media segment from the plurality of media segments for modifying, the media segment having at least one of a lowest time spent value from among the plurality of media segments or a time spent value below an expected time spent value for the media segment; and modifying the identified media segment.

20. The system of claim 19, wherein identifying a media segment for modifying comprises identifying a section from a plurality of sections associated with the segment for modification.

21. The system of claim 19, wherein modifying the segment comprises re-ordering at least one section of the segment, wherein the segment comprises a plurality of sections.

22. The system of claim 19, wherein modifying the segment comprises removing at least one section of the segment, wherein the segment comprises a plurality of sections.

* * * * *